Feb. 21, 1967  C. SCHNELL  3,304,976
COMMINUTING MACHINE
Filed Oct. 14, 1965  9 Sheets-Sheet 3
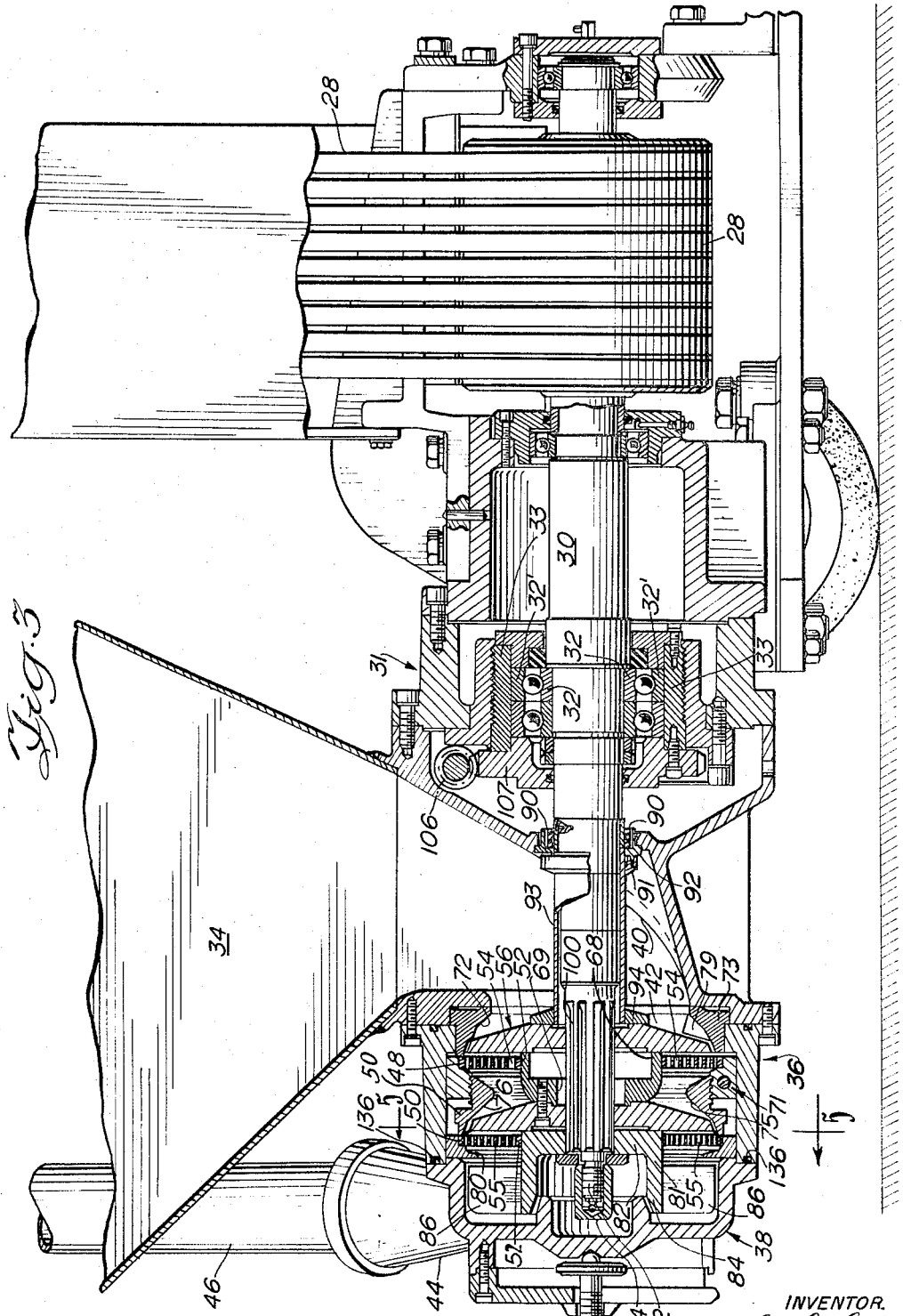
INVENTOR.
Carl Schnell
BY Merriam, Marshall,
Shapiro & Klose ATTORNEYS.

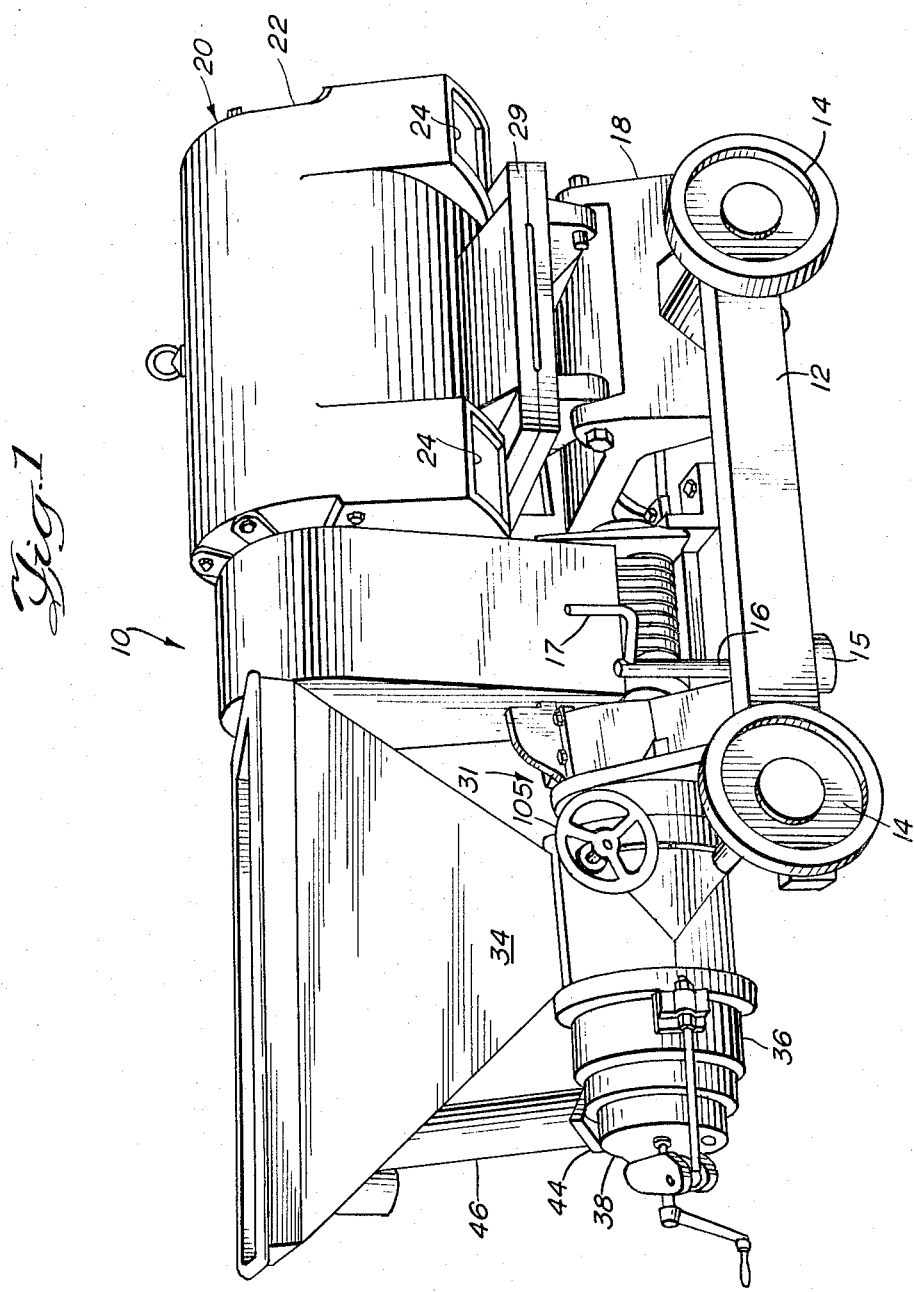

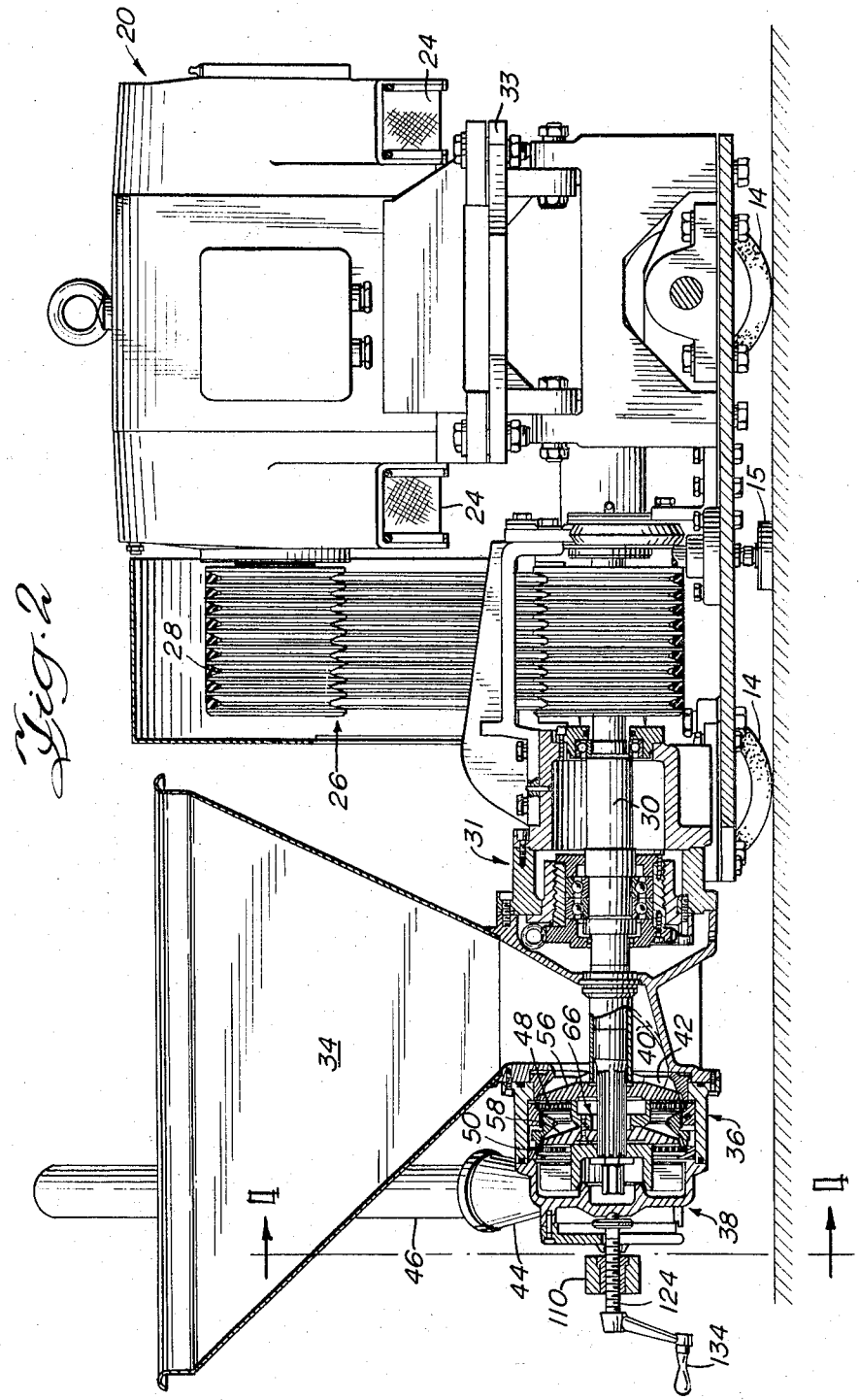

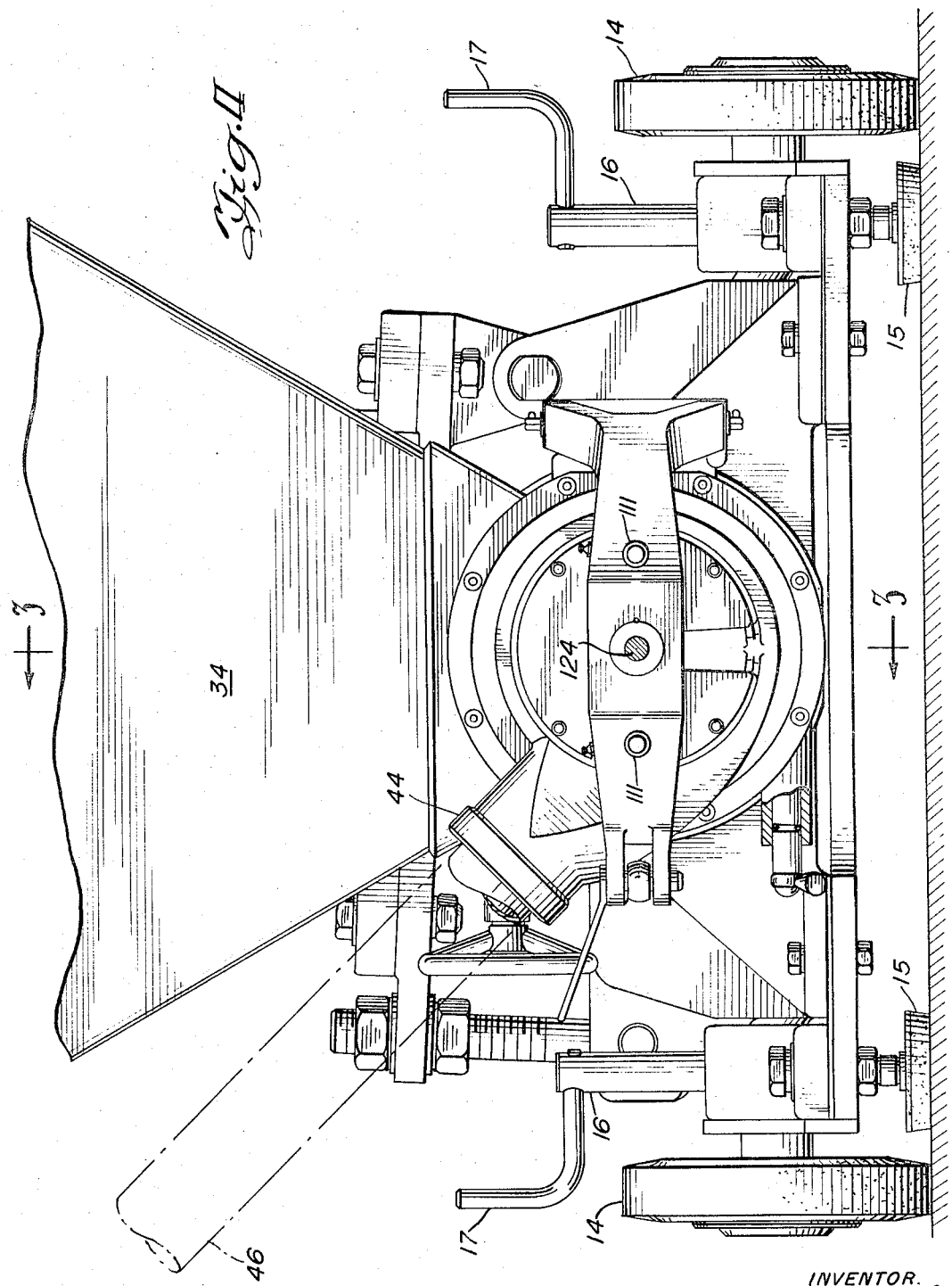

Feb. 21, 1967 C. SCHNELL 3,304,976
COMMINUTING MACHINE
Filed Oct. 14, 1965 9 Sheets-Sheet 5
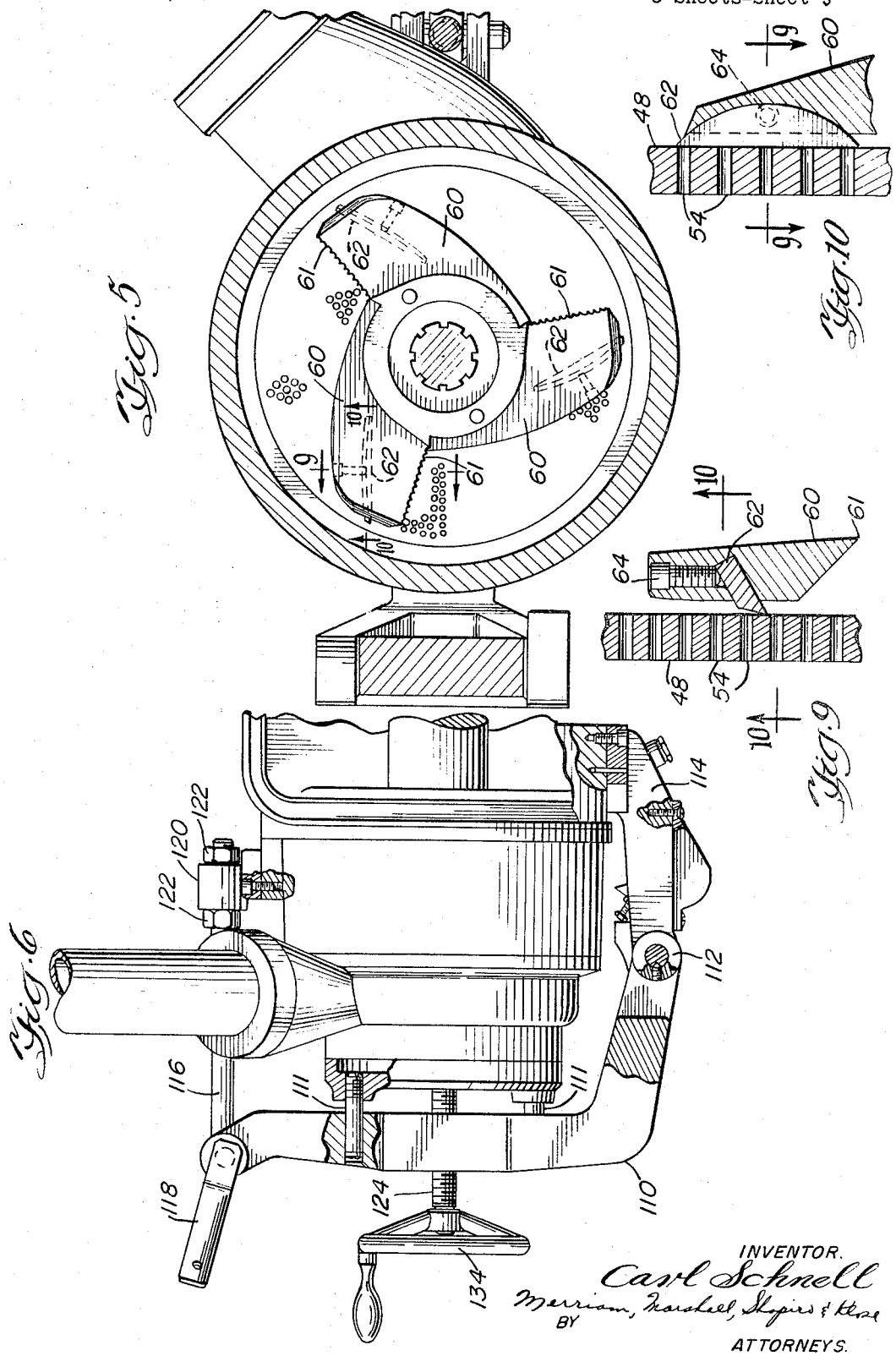
INVENTOR.
Carl Schnell
BY Merriam, Marshall, Shapiro & Klose
ATTORNEYS.

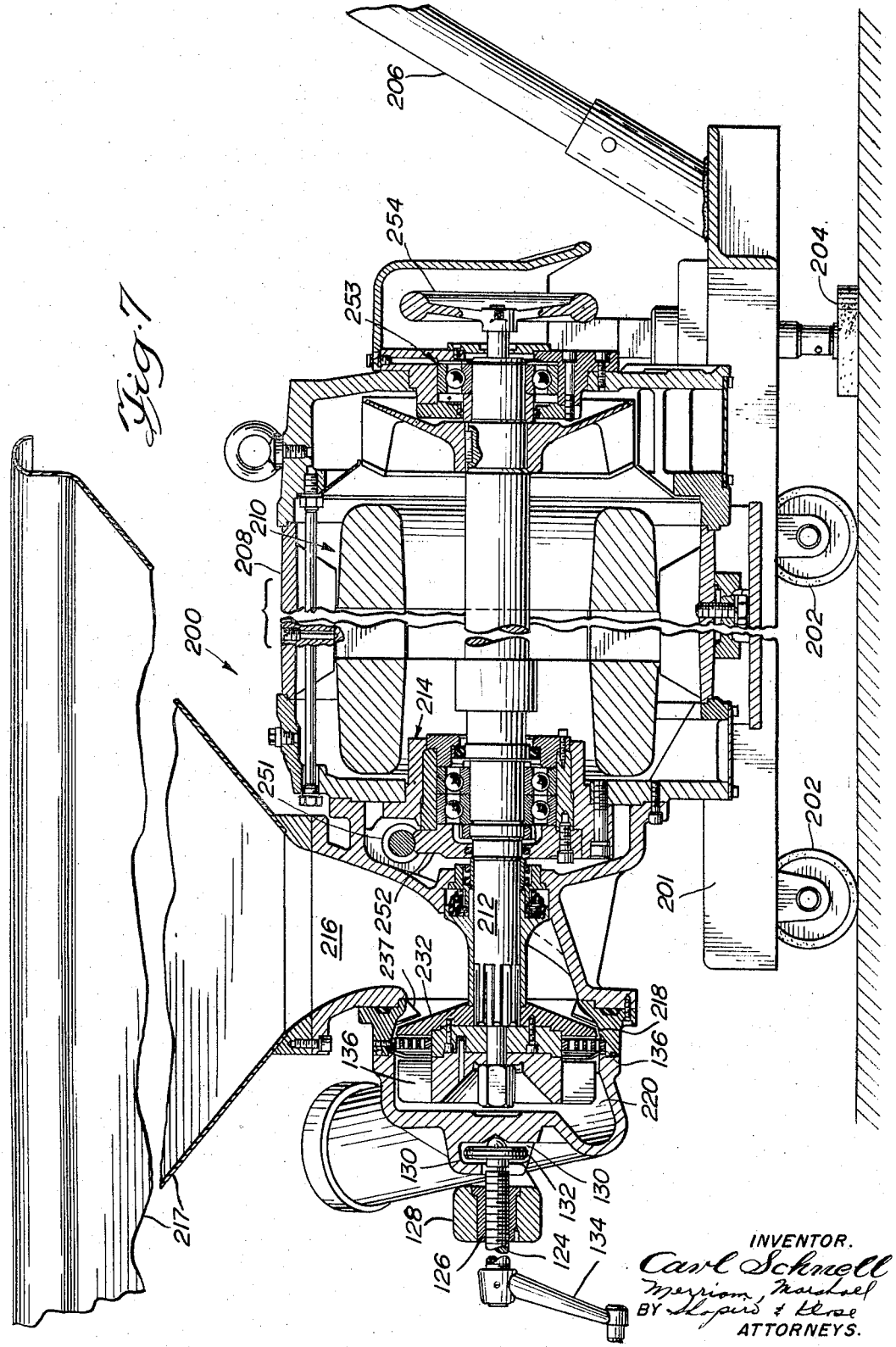

INVENTOR.
Carl Schnell

Feb. 21, 1967

C. SCHNELL 3,304,976

COMMINUTING MACHINE

Filed Oct. 14, 1965

INVENTOR.
Carl Schnell

BY Merriam, Marshall, Shapiro & Klose

ATTORNEYS.

INVENTOR.
Carl Schnell

United States Patent Office 3,304,976
Patented Feb. 21, 1967

3,304,976
COMMINUTING MACHINE
Carl Schnell, Wurttemberg, Germany, assignor of one-half to The Griffith Laboratories, Inc., Chicago, Ill., a corporation of Illinois
Filed Oct. 14, 1965, Ser. No. 495,911
5 Claims. (Cl. 146—182)

This application is a continuation-in-part of my copending application Serial No. 401,776, filed October 6, 1964.

This invention relates to comminuting machines suitable for use in producing comminuted comestible products, especially agricultural and animal products including meat products used for making emulsions for sausages and the like.

In its more specific aspect, this invention relates to centrifugal, high speed comminuting machines which constitute a modification of the machine shown and described in U.S. Patent No. 3,044,514.

For most purposes, it is desirable that the comestible product such as raw meat be comminuted at a high rate of discharge or throughput under conditions that avoid overheating the product. It is important in making meat emulsions that the product be comminuted and discharged substantially free from ingress of air.

In general, the comminuting machines of this invention comprise in communicating sequence a feed or reservoir chamber, a comminuting chamber and a discharge chamber (preferably having an ejector rotor), which chambers may be sealed against ingress of air during operation. The machine, when sealed during operation, is arranged to produce a continuous and moving hydraulic column of product (e.g., meat emulsion) free from ingress of air. As a result, the output of the machine is increased and an excessive temperature rise in the meat product is avoided.

The comminuting machine includes a powered shaft means extending from a motor through the wall of the inlet or neck portion of the comminuting chamber into that chamber. The shaft means drives at least one high speed propelling knife in the comminuting chamber and, preferably, a centrifugal ejector rotor in the discharge chamber. The shaft means is sealably mounted during operation thereby preventing the ingress of air when the machine is comminuting comestible products (e.g., meat products).

Means are provided for readily disengaging the discharge chamber from the comminuting chamber thereby providing easy access to the several parts mounted in the various chambers, which then may be readily removed from their respective chambers or positions, cleaned or replaced, and reassembled in their operating positions. There is no need for providing means for retracting or pivoting the hopper or reservoir chamber away from and toward the high speed propelling knife or the portion of the comminuting chamber which encircles the knife. In constructing the machine, therefore, the reservoir or hopper chamber is in a fixed or stationary position.

Where desired, the comminuting machines herein described may be constructed to provide either a single high speed propelling knife and single perforate plate or a plurality of high speed propelling knives operatively associated with their respective perforate plates. A comminuting machine that has a plurality of knives, however, generally produces a finer textured product, e.g., meat product or meat emulsion.

Reference is now had to the following detailed specification, and to the accompanying diagrammatic drawings in which my invention is shown. In the drawings:

FIGURE 1 is a side perspective view of a comminuting machine embodying my invention;

FIGURE 2 is a side elevational view partly in section of the machine of FIGURE 1 showing in more detail various components of the machine;

FIGURE 3 is an enlarged sectional elevation view showing a part of the machine of FIGURE 2 in still further detail;

FIGURE 4 is an end view of the machine of FIGURE 1;

FIGURE 5 is a plan view of a portion of the comminuting chamber showing a high speed propelling knife located in advance of a perforate plate (only a few of the holes are shown therein);

FIGURE 6 is a plan view partly in section illustrating the mounting of the discharge chamber which enables it to be moved selectively away from and toward the comminuting chamber;

FIGURE 7 is a side elevational section of a modified comminuting machine falling within the scope of this invention;

FIGURE 9 is an enlarged cross-sectional view of the knife and perforate plate taken on line 9—9 of FIGURE 5;

FIGURE 10 is a cross-sectional view taken on line 10—10 of FIGURE 9;

Figure 8:
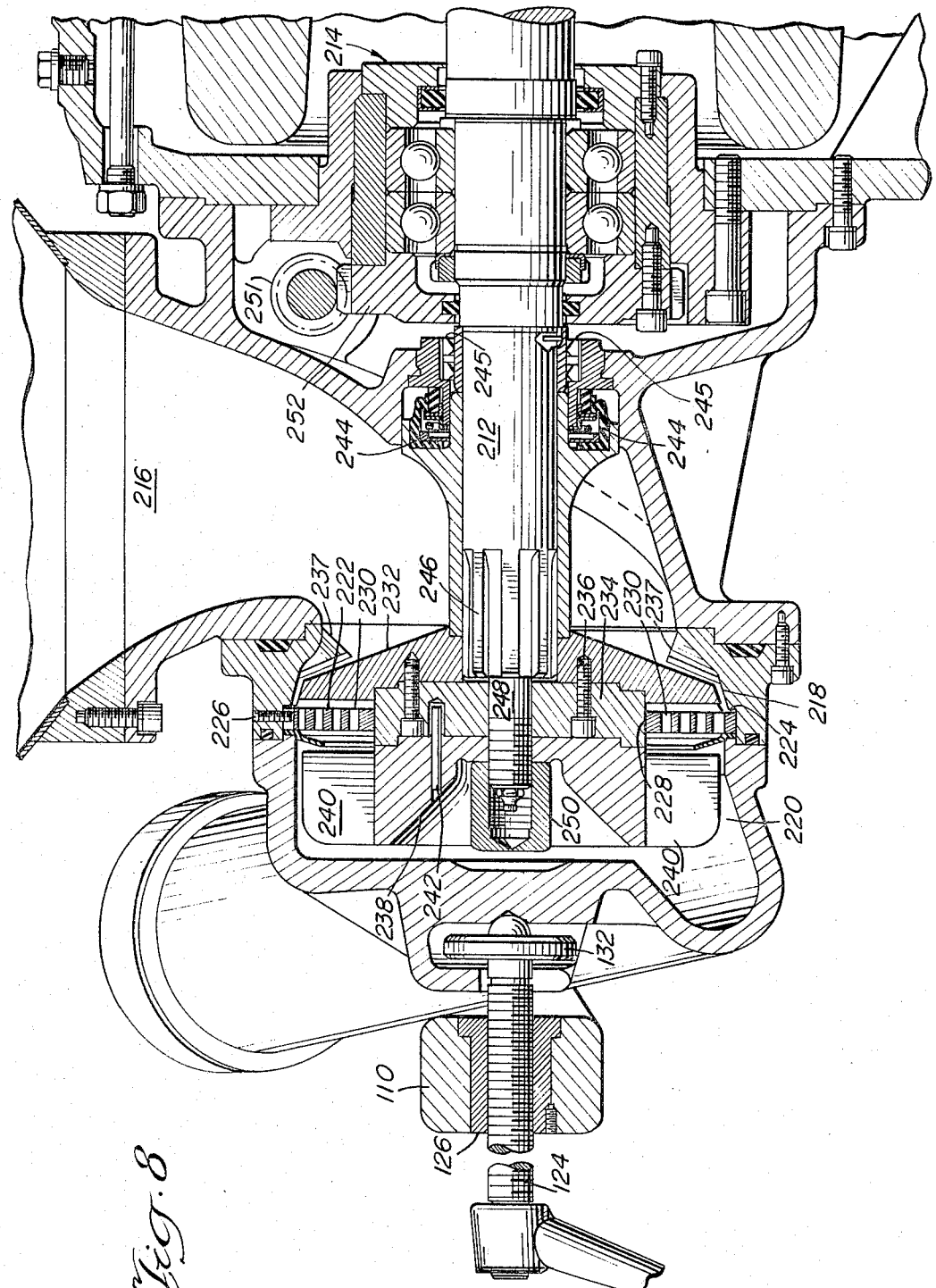
FIGURE 8 is an enlarged side elevational sectional view of FIGURE 7 showing in more detail components of the invention.

Referring to the drawings wherein like reference numerals designate similar parts throughout, there is shown in FIGURE 1 a comminuting machine designated in general by the reference numeral 10 suitable for comminuting foodstuff and, for example, capable for producing a meat emulsion such as used for sausage. The comminuting machine is supported by a platform 12 having wheels 14 for moving the machine, and feet 15 which are connected to adjustable legs 16 having a hand crank 17 used for braking the machine when in use.

A second smaller platform 18 is arranged to one side of platform 12 and is supported thereon by suitable means. An electric motor, designated generally by the numeral 20 is supported on platform 18 by suitable means, and includes a housing 22 having an air intake and air outlet 24.

A motor pulley 26 having a belt drive 28 is positioned adjacent motor 20, and suitable drive means extending from the motor 20 is employed for driving the belt drive. There is provided a movable motor platform 29 to allow for belt adjustment in operating the machine.

Drive shaft 30 extending from belt drive 28 and being driven thereby extends through the bearing housing, indicated generally by the numeral 31, and extends into the comminuting section of the machine, to be described in greater detail hereinbelow. The bearing housing typically might be a double ball bearing structure that has inner bearing race portions 32 clamped to the drive shaft 30 and outer bearing race portions 32' clamped to the bearing cage 33 such as might be shown in FIGURE 3.

The comminuting machine of my invention which is driven by the motor means through drive shaft 30 comprises wall means that defines in advancing and communicating sequence a stationary, frusto-conical reservoir or feeding hopper chamber 34, a comminuting chamber 36 and a discharge chamber 38. It is significant that in the construction of the machine the arrangement of the various chambers provides during operation (e.g., with meat products) of the machine a continuous and moving hydraulic column of material substantially free from ingress of air and extending from at least the entrance way of the comminuting chamber to at least the discharge chamber outlet.

The comestible material is fed through the upper opening of the hopper 34 and passes downwardly therethrough under pressure of gravity. Where desired, the hopper may be covered and the material forced fed by a suitable pump such as a positive displacement pump. The hopper is mounted or supported along the bearing housing 31 which in turn is supported on platform 12 by suitable means. The comminuting chamber 36 is provided with a curved inlet or neck portion 40 communicating directly with the hopper and a substantially horizontal portion 42. Positioned adjacent the comminuting chamber and communicating directly therewith is discharge chamber 38 disposed about its horizontal axis, and having an outlet means or discharge port or opening 44 and a discharge nozzle or horn 46.

Figure 13:
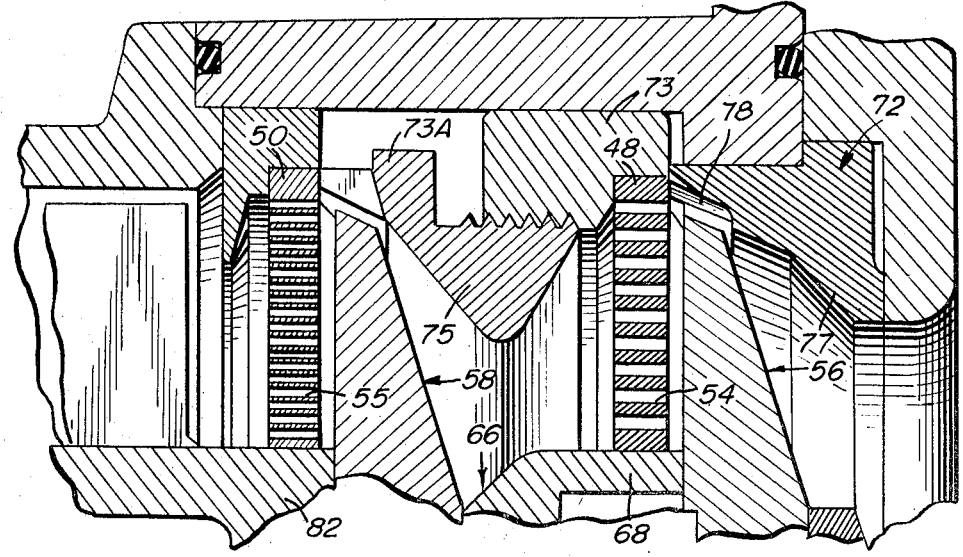
FIGURE 13 is an enlarged sectional view of the two knives and perforate plates shown in FIGURE 3.

Referring more specifically to FIGURES 3 and 13, there is shown a pair of spaced, vertically disposed perforate valve plates 48 and 50 of similar construction. The plates are mounted in a stationary position in the comminuting chamber 36 during operation, and desirably are made of metal. Plates 48 and 50 are provided with relatively large central openings 52 and a multiplicity of relatively small openings 54 and 55 throughout the annulus of the plates. It is desirable that openings 54 in plate 48 be relatively larger than holes 55 in plate 50 in order to give a more coarse cut in the first passage of the material thereby facilitating comminuting. The plates 48 and 50 are mounted in the interior wall of the comminuting machine and are held against rotation during operation of the machine by any suitable means such as a shear pin or set screw (not shown). The perforate valve plates 48 and 50 create or produce back pressure upon the product in the comminuting chamber 36.

The comminuting machine as illustrated more clearly in FIGURE 3 employs two high speed propelling knives 56 and 58 of substantially identical construction. Each knife is positioned adjacent a perforate valve plate and in shearing relationship therewith. The high speed propelling knives are balanced for rotation in the comminuting chamber, and rotate along a vertical plane at right angles to the axis of the drive shaft 30. The knives employed may be of the general type described in U.S. Patent No. 3,044,514. Knives of this type include a knife mount or arms 60 having a leading cutting edge 61 and holds a suitable blade 62 having a trailing cutting edge by means of set screw 64. (See FIGURES 9 and 10.) An inclined propelling face slopes from the leading edge toward the perforate plate and is positioned between the planes generated upon rotation of the leading and trailing cutting edges.

The inclined face of each knife mount acts as a propeller to urge material toward their respective perforate valve plates 48 and 50. The trailing or lower cutting edges of the blade 62 bear on the perforate valve plates and cut or shear material thereat. The knife arms are tapered outwardly, and this outward taper equalizes the work done along the length of the mounts. The taper thus provides hydrodynamic balance. The face of each knife has a changing and increasing degree of inclination relative to the axis of rotation as the face approaches the path of rotation of the trailing edge. This provides a pressure pocket that extends forwardly in rotation of the trailing edge and extends along the length of that edge. The pressure pocket urges material that is difficult to cut into better cutting engagement with the trailing cutting edge of the knife and the small holes 54 in the perforate valve plate 48.

Spacing disk 66 having an annular base 68 depending therefrom for insertion within the central opening 52 of perforate valve plate 48 is in abutting engagement with knife 58, and is free to rotate with the knives within the large central opening 52. The spacing disk is provided with a central opening 69. Knife 58 is secured to the circular spacing disk by means of screw 70.

Figure 14:
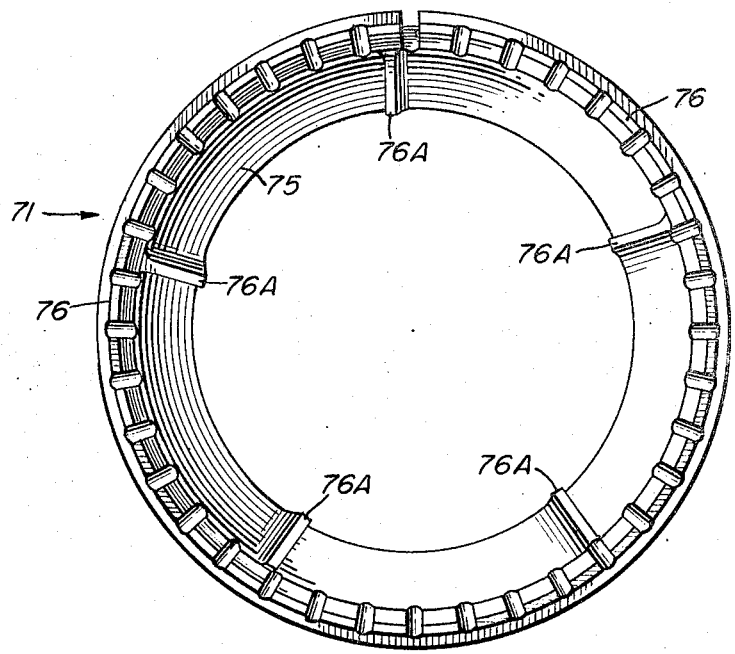
FIGURE 14 is an enlarged plan view of the adjustable lug ring.
Figure 15:
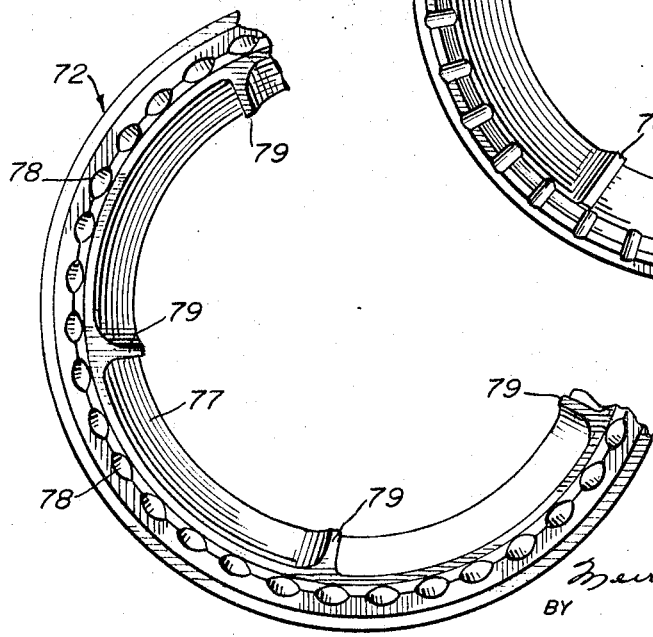
FIGURE 15 is an enlarged fragmentary plan view of annular lug ring.

An adjustable lug rim 71 (see FIGURE 14), having male and female threads for adjustment, is mounted intermediate the perforate valve plates 48 and 50 in the comminuting chamber 36. Annular lug ring 72 is fixedly mounted adjacent knife 56 in horizontal portion 42. Lug ring 71 comprises an annular base ring 73 having female threads and a crown 73A having male threads and an inwardly sloping or protruding section 75 from which extends a plurality of spaced fingers or hang-downs 76 to provide cutting edges and a plurality of inwardly protruding spaced lugs 76A. Through use, the cutting edges of the spaced fingers are dulled; but because the fingers are spaced, sharpening is facilitated. As shown in FIGURE 15, annular lug ring 72 is provided with an inwardly sloping wall 77 scalloped at 78 to provide inwardly disposed cutting edges and a plurality of spaced lugs 79. The adjustable lug ring 71 is in abutting and supporting engagement with the perforate valve plates 48 and 50 whereby an adjustment of the lug ring adjusts the relative position of plate 48 and therefore adjusting the space between the plates.

There is provided rearwardly of each knife (upstream) in the comminuting chamber 36 obstructing means for directing circulation of material undergoing comminution toward the rotating knives 56 and 58 and perforate valve plates 48 and 50, and relieve or counteract back pressure exerted by the plates. The obstructing means include lug rings 71 and 72 and their respective elements, and/or restricted neck of the comminuting chamber, and/or recirculating surfaces of the comminuting chamber. Thus, the obstructing means adjacent knife 56 includes inwardly sloping wall of lug ring 72, spaced lugs 79, the inwardly sloping surfaces between the lugs 77 of the lug ring, and the inwardly sloping wall or neck portion 40. Obstructing means adjacent knife 58 includes a continuous series of inwardly protruding section 75 having spaced fingers 76 and lugs 76A of adjustable lug ring 71.

A venturi ring or annular suction ring 80 directs comminuted material centrally and increases the velocity of material being fed to the wings or blades 86 of the ejector rotor 81 in the discharge chamber 38. This ring is shown and described in added detail in my application Serial No. 105,504, filed April 25, 1961, now Patent Number 3,149,653.

The ejector or throwout rotor 81 has a substantially flat base 82 and an annular extension 84. The base 82 of the ejector rotor is mounted in the large central opening 52 of perforate valve plate 50 and is free for rotation therein. The depending annulus 84 extends into the discharge chamber and is provided with a plurality of laterally disposed wings 86.

Drive shaft 30 extends from the motor pulley, through the bearing housing 32, and continues on through the upwardly and inwardly sloping circulatory wall of the neck portion 40 of the comminuting chamber 36 and terminates within the discharge chamber 38. Because of the importance of preventing the ingress of air to the comminuting machine, there is provided suitable sealing means 90 and 91. Such sealing means comprise air-sealing, circular spring-loaded seals, and the lips of the seals may be made from rubber, plastic, graphite, etc. Seals such as shown in FIGURE 9 of U.S. Patent No. 3,044,514 may be used. Sealing means 90 is mounted in bushing 92. Horizontal spacer 93, having flange 94, mounted on drive shaft 30 and extending through the neck portion 40 of the comminuting chamber 36 positions knife 56.

Drive shaft 30 has a splined section 100 and a reduced circular section or stud section 102 which is threaded to accommodate internally threaded nut 104. Knives 56 and 58 and ejector rotor 81 are provided with a centrally disposed splined opening for cooperation with the splined section 100 of drive shaft 30. In this manner, rotation of drive shaft 30 by the drive means effects rotation of the high speed propelling knives, the spacing disk, the ejector rotor and the spacer.

In order to adjust the axial distance of the knives 56 and 58 relative to the perforate valve plates 48 and 50, the drive shaft 30 may be selectively moved in an axial direction by means of a suitable gear such as shown in FIGURE 4 of U.S. Patent No. 3,044,514. More specifically, this axial movement is effected by turning an exteriorly disposed handwheel 105 which rotates a worm 106 and in turn rotates the complementary worm gear 107. The worm gear is secured to the bearing cage 33 to rotate, which causes the inner bearing races which are clamped to the shaft 30, to axially move the shaft 30 and the knives 56 and 58 as well as the ejector rotor 81.

Discharge chamber 38 is pivotally mounted so that it can be disengaged from the comminuting chamber to permit access to the comminuting chamber for servicing and cleaning as well as to permit the replacement of a new or modified constructed discharge chamber. The discharge chamber is connected to the swivel yoke 110 by means of pins 111, and the yoke is pivotally mounted at one end at 112 to fixed lug 114 which is secured to the wall of the comminuting chamber 36. (See FIGURE 6.) The opposite end of swivel yoke 110 is secured to axially adjustable rod 116 by means of a removable clevis pin 118. The opposite end of rod 116 is threaded and passes through threaded bushing 120 which is affixed to the wall of the comminuting chamber. Internally threaded nut members 122 engage the threaded portion of rod 116 and are disposed to each side of bushing 120. Adjustment of rod 116 through bushing 120 adjusts the relative position of the rod, and nut members 122 lock the rod in place, thereby providing proper aligment between the discharge chamber and the comminuting chamber for effecting an airtight seal.

Upon removal of the clevis pin 118, the swivel yoke 110 may be swung or pivoted from rod 116 since the discharge chamber 38 is connected to the swivel yoke by means of pins 111. This pivotal movement of the swivel yoke causes the discharge chamber to be pivoted completely free of the comminuting chamber.

As explained above, it is important to have an airtight seal between the chambers of the comminuting machine to prevent the ingress of air. A complete airtight seal between the discharge chamber and the comminuting chamber is accomplished by means of this invention in that there is provided means for effecting the axial translation of the discharge chamber after the discharge chamber is in a closed position. There is provided threaded locking bolt member 124 for threadedly engaging internally threaded bushing 126 which is mounted against rotation in yoke 110. (See FIGURES 2, 6, 7 and 11.) The locking bolt member extends into the wall of discharge chamber 38 and terminates in cavity 130. This end of the locking bolt member is nonthreaded and washer 132 is mounted thereon. The opposite end of the locking bolt member is provided with a handle, crank or wheel 134.

After the discharge chamber is engaged with the comminuting chamber and the swivel yoke locked in place, the air-tight seal between the two chambers may be effected by means of the locking bolt member 124. To accomplish this, the crank 134 is rotated to axially translate the locking bolt member 124 against the wall of the discharge chamber. This in turn advances the discharge chamber on pins 111 into air-tight engagement with sealing gasket 136 that is positioned in a channel in the marginal end wall of the comminuting chamber. When it is desired to disengage the discharge chamber, the crank is rotated in the opposite direction thereby axially translating the locking bolt member and washer 132 engages wall 137 of cavity 130, and as the crank is further rotated the discharge chamber slides back on pins 111 to break the seal between the two chambers. The swivel yoke 110 is then pivotally displaced, as explained above.

Disengagement of the discharge chamber from the comminuting chamber affords ready and complete access to the parts of the machine retained within the discharge chamber and the comminuting chamber. This facilitates assembling the machine and disassembling the machine, displacement of the parts and cleaning of the machine and its parts. In addition, it provides means for displacing one type of discharge chamber with another type. For example, discharge chamber 38 may be replaced with a discharge chamber that employs no ejector rotor. (See FIGURES 11 and 12.)

Referring now to the operation of the comminuting machine such as shown in FIGURES 1-6, the meat material to be comminuted or emulsified is fed into the reservoir or hopper chamber 34 and from there passes through the curved inlet portion 40 of the comminuting chamber 36 to the high speed rotary propelling knives 56 and 58. The obstructing means provide recirculation toward the knife and plate. The knives 56 and 58 propel material centrifugally outwardly of their axes of rotation as well as toward their respective perforate valve plates 48 and 50, and material that advances to the trailing cutting edges of the knives is cut in conjunction with and at the multitude of small openings 54 and 55 in the perforate valve plates.

The perforate valve plates exert a back pressure because the plates cannot pass material as fast as it is fed. This back pressure subjects material to retrograde and axially spiral movement away from the plates while, at the same time, the centrifugal action of the knives cause material to be moved outwardly. As a consequence, the perforate valve plate 48 sends the material back and inwardly toward the axis of rotation to the curved inlet or neck portion 40 of the comminuting chamber where it mixes with incoming material. Perforate valve plate 50 sends the material back and inwardly where it mixes with the material feeding from plate 48. Meat material is thus presented and represented to the high speed propelling knives and perforate valve plates and there is repeated mixing and cutting of material in the comminuting chamber.

The ejector rotor 81 produces suction on the material being comminuted and propels the uniformly distributed material from the plates to and through the discharge port 44 and then through the discharge horn 46. The meat material being comminuted creates an air-sealing head rearwardly or upstream of the perforate valve plates and knives, and a continuously advancing hydraulic column of meat material extends at least to the inlet end of the discharge nozzle 46.

When the perforate valve plates 48 and 50 have an outer diameter of 225 mm. and inner diameter of 120 mm., the knives 56 and 58 may be rotated at about 3000 r.p.m. by a 100 horsepower motor. With such a machine, meat for sausage, e.g. frankfurters, that has been previously cut in a chopper may be uniformly emulsified at an approximate rate of about 275–600 pounds per minute.

There is shown in FIGURES 7 and 8 a modification of the invention employing a single high speed propelling knife rather than a multiple arrangement of knives. In this embodiment, the comminuting machine 200 is supported by a suitable platform 201 having wheels 202, an adjustable braking foot 204 and a handle 206. Casing 208 for housing the motor, indicated generally by the numeral 210, is mounted on the platform 201. A drive shaft 212 extends from the motor through bearing housing 214 and into the comminuting section of the machine, as explained in greater detail hereinbelow. The bearing housing typically might be a ball bearing structure as described above with reference to the previous embodiment.

The comminuting machine of this embodiment includes in advancing and communicating sequence a reservoir or hopper chamber 216, a comminuting chamber 218 and a discharge chamber 220. The reservoir chamber and neck portion of the comminuting chamber are mounted in a stationary position, and the discharge chamber is mounted for pivotal movement, substantially as explained above with reference to the previous embodiment.

Referring more specifically to FIGURE 8, there is shown perforate valve plate 222 disposed vertically in the annular groove 224 of the wall of the comminuting chamber. The perforate valve plate is mounted against rotation by means of set screw 226. The perforate valve plate is provided with a relatively large central opening 228, and a multiplicity of relatively small openings 230 throughout the annulus of the plate.

The comminuting chamber includes a high speed propelling knife 232 that is balanced for rotation in the comminuting chamber and rotates along a vertical plane at a right angle to the axis of the drive shaft. Spacing disk 234 is arranged in opening 228 and is secured to the knife by means of screw 236. The spacing disk is free to rotate within the opening 228 upon rotation of the knife. Lug ring 237 is arranged adjacent the knife 232 substantially as explained above with reference to the previous embodiment.

An ejector rotor 238 having a plurality of wings 240 laterally disposed therefrom is mounted in the discharge chamber 220 at the end of drive shaft 212. The ejector rotor is in abutting engagement with spacing disk 234 by means of pins 242.

Drive shaft 212 extends from the motor through the bearing housing 214 and continues on through the comminuting chamber 218 and terminates within the discharge chamber 220. Suitable sealing means 244 and 245, such as described hereinabove as spring-loaded rubber or plastic seals, is provided to prevent the ingress of air into the comminuting machine. Drive shaft 212 has a splined section 246 for cooperating with a centrally disposed splined opening of the knife 232. The stud terminus 248 of the drive shaft 212 is threaded to accommodate internally threaded nut 250 which secures the ejector rotor, spacing disk and knife in position for operation. In this manner, rotation of the drive shaft by the motor effects rotation of the high speed propelling knife, the spacing disk and the ejector rotor.

In order to adjust the shearing engagement of the knife 232 relative to the perforate valve plate 222, the drive shaft may be moved axially by means of the worm 251 and gear 252 substantially as described above. The drive shaft is extended in its opposite direction through bearing housing 253, and wheel 254 is connected with the end of the drive shaft. Rotation of the wheel 254 turns the drive shaft which enables one to determine the degree of pressure exerted by the knife against the perforate valve plate.

The discharge chamber 220 is pivotally mounted for disengagement from the comminuting chamber, and further is mounted for axial translation to effect an air-tight seal with the comminuting chamber, as explained hereinabove. Operation of this embodiment of the invention is substantially as previously explained.

Figure 11:
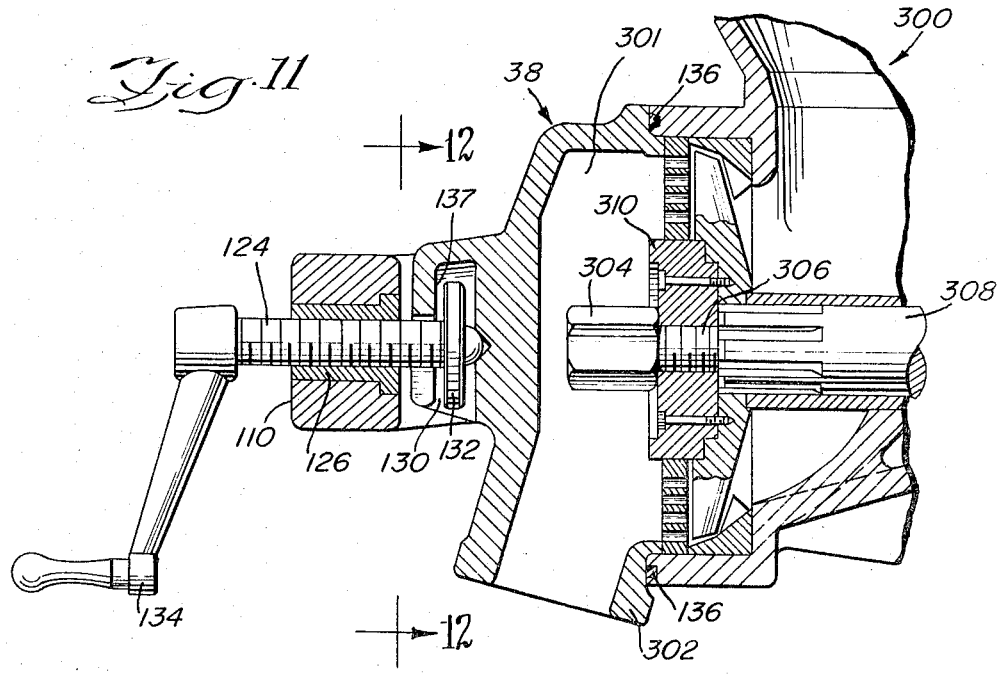
FIGURE 11 is an enlarged, fragmentary sectional view showing portions of another modification of comminuting and discharge chambers.
Figure 12:
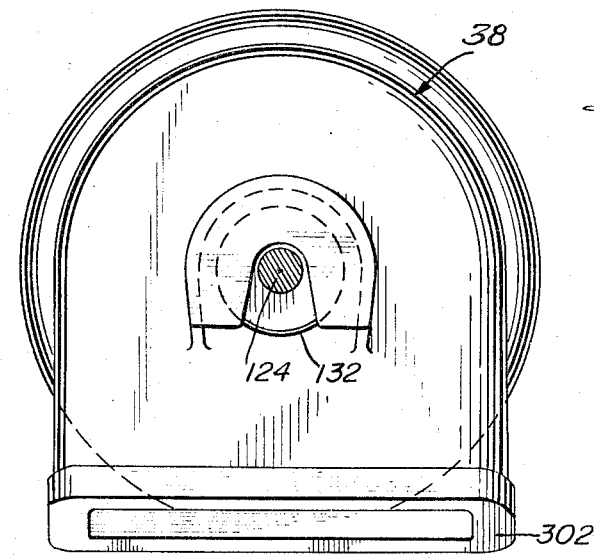
FIGURE 12 is an elevational view taken on line 12—12 of FIGURE 11.

A still further modification of the invention is shown in FIGURES 11 and 12. There is illustrated a section of a comminuting machine 300 having a single high speed propelling knife machine. No ejector rotor is employed in the discharge chamber, and the discharge chamber 301 is provided with a substantially rectangular discharge nozzle 302. Internally threaded nut member 304 which is threaded on the stud terminus 306 of drive shaft 308 engages spacing disk 310 thereby securing the various elements in place for operation. The discharge chamber 301 is pivotally mounted for disengagement from the comminuting chamber, and further includes means for effecting the axial translation of the discharge chamber to effect an air-tight seal with the comminuting chamber, substantially as described above. This modification may be used for making a coarsely comminuted meat product, such as hamburger meat.

The foregoing detailed description has been given for clearness of understanding only, and no unnecessary limitations should be understood therefrom, as modifications will be obvious to those skilled in the art.

What is claimed is:

1. An apparatus for comminuting food material comprising in advancing and communicating sequence a reservoir chamber with inlet means, a comminuting chamber, and a discharge chamber having outlet means; means for pivotally mounting said discharge chamber for disengaging said discharge chamber from said apparatus and to permit access to said comminuting chamber; means to effect axial translation of said discharge chamber in cooperation with said comminuting chamber to effect a seal between said discharge chamber and said comminuting chamber; drive means having a drive shaft extending from said drive means through said comminuting chamber and terminating within said discharge chamber and being sealed during operation; propelling cutter means arranged in said comminuting chamber and operatively connected with said drive means; obstructing means disposed in said comminuting chamber in co-acting relation with and adjacent said cutter means and disposed intermediate said cutter means and said reservoir chamber; a perforate valve plate means laterally disposed in said comminuting chamber and adjacent said cutter means and disposed opposite said cutter means with respect to said obstructing means; whereby food product being processed in said apparatus is capable of forming a continuous hydraulic column extending from at least the comminuting chamber to said outlet means of said discharge chamber.

2. Apparatus according to claim 1 wherein said pivotal mounting means includes a swivel yoke connected to the wall of said discharge chamber, means to pivotally mount said yoke at one end thereof and means to adjustably mount said yoke at its opposite end to provide for proper alignment of said discharge chamber with said comminuting chamber.

3. Apparatus according to claim 1 wherein said means to effect axial translation of said discharge chamber comprises an elongated threaded member extending outwardly from the wall of the said discharge chamber, and an internally threaded bushing for threadedly engaging said elongated member and mounted for nonrotation intermediate the ends of said elongated member, whereby rotation of said elongated member effects said axial translation.

4. An apparatus for comminuting food material comprising in advancing and communicating sequence a reservoir chamber with inlet means, a comminuting chamber, and a discharge chamber having outlet means; a swivel yoke connected to the wall of said discharge chamber and including means to pivotally mount said yoke at one end thereof and means to adjustably mount said yoke at its opposite end for pivotally disengaging said discharge chamber from said apparatus thereby permitting access to said comminuting chamber and to provide for proper alignment of said discharge chamber with said comminuting chamber; an elongated threaded member extending outwardly from the wall of said discharge chamber, an internally threaded bushing for threadedly engaging said elongated member and mounted for nonrotation in said swivel yoke intermediate the ends of said elongated member, whereby rotation of said elongated member effects the axial translation of said discharge chamber in cooperation with said comminuting chamber to effect a seal between said discharge chamber and said comminuting chamber; drive means having a drive shaft extending from said drive means through said comminuting chamber and terminating within said discharge chamber and being sealed during operation; propelling cutter means arranged in said comminuting chamber and operatively connected with said drive means; obstructing means disposed in said comminuting chamber in co-acting relation with and adjacent said cutter means and disposed intermediate said cutter means and said reservoir chamber; a perforate valve plate means laterally disposed in said comminuting chamber and adjacent said cutter means and disposed opposite said cutter means with respect to said obstructing means; whereby food product being processed in said apparatus is capable of forming a continuous hydraulic column extending from at least the comminuting chamber to said outlet means of said discharge chamber.

5. Apparatus according to claim 1 wherein is included means for axially adjusting the distance of said cutter means relative to said plate means.

References Cited by the Examiner
UNITED STATES PATENTS

| | | | |
|---|---|---|---|
| 1,459,713 | 6/1923 | Beggs | 146—182 X |
| 3,064,701 | 11/1962 | Kircher | 146—182 |
| 3,076,489 | 2/1963 | Schmidt et al. | 146—182 |
| 3,219,081 | 11/1965 | Brundler | 146—182 |

WILLIAM W. DYER, JR., *Primary Examiner.*

W. GRAYDON ABERCROMBIE, *Examiner.*